(12) United States Patent
Hulet et al.

(10) Patent No.: US 9,330,418 B2
(45) Date of Patent: May 3, 2016

(54) SYSTEM AND METHOD FOR CREATING A FAMILY TREE DATA STRUCTURE

(75) Inventors: Kendall Hulet, Provo, UT (US); Christopher D. Bradford, Spanish Fork, UT (US); Joshua Penrod, Orem, UT (US)

(73) Assignee: Ancestry.com Operations Inc., Provo, UT (US)

( * ) Notice: Subject to any disclaimer, the term of this patent is extended or adjusted under 35 U.S.C. 154(b) by 680 days.

(21) Appl. No.: 13/618,568

(22) Filed: Sep. 14, 2012

(65) Prior Publication Data

US 2014/0082568 A1    Mar. 20, 2014

(51) Int. Cl.
G06F 3/048 (2013.01)
G06Q 50/00 (2012.01)
G06F 17/30 (2006.01)
H04L 29/08 (2006.01)

(52) U.S. Cl.
CPC .......... *G06Q 50/01* (2013.01); *G06F 17/30961* (2013.01); *H04L 67/306* (2013.01)

(58) Field of Classification Search
CPC . G06F 17/30961; G06Q 50/01; H04L 67/306
See application file for complete search history.

(56) References Cited

U.S. PATENT DOCUMENTS

| | | | |
|---|---|---|---|
| 8,095,567 B2 * | 1/2012 | Cookson, Jr. ..... | G06F 17/30864 707/797 |
| 8,244,848 B1 * | 8/2012 | Narayanan ............. | G06Q 50/01 709/218 |
| 8,856,082 B2 * | 10/2014 | Hale ................. | G06F 17/30893 707/668 |
| 2006/0067563 A1 * | 3/2006 | Whitehead ............. | G06Q 90/00 382/115 |
| 2007/0266003 A1 * | 11/2007 | Wong ..................... | G06Q 90/00 |
| 2009/0070434 A1 * | 3/2009 | Himmelstein .......... | G06F 17/30 709/217 |
| 2009/0132264 A1 * | 5/2009 | Wood ................ | G06F 17/30247 705/319 |
| 2010/0241580 A1 * | 9/2010 | Schleier-Smith ...... | G06Q 30/02 705/319 |
| 2011/0029521 A1 * | 2/2011 | Thayne ............. | G06F 17/30943 707/737 |
| 2011/0029543 A1 * | 2/2011 | Graham ................. | G06Q 10/10 707/749 |
| 2011/0029564 A1 * | 2/2011 | Graham ................. | G06Q 10/10 707/782 |
| 2012/0066118 A1 * | 3/2012 | Dantas .................... | G06Q 50/01 705/39 |
| 2012/0158935 A1 * | 6/2012 | Kishimoto ............. | G06Q 50/01 709/223 |
| 2012/0284341 A1 * | 11/2012 | Masood ................. | G06Q 50/01 709/205 |
| 2012/0331064 A1 * | 12/2012 | Deeter ................... | G06Q 50/01 709/206 |
| 2013/0159096 A1 * | 6/2013 | Santhanagopal ...... | G06Q 50/01 705/14.49 |
| 2014/0067931 A1 * | 3/2014 | Harik .................... | H04L 67/306 709/204 |
| 2014/0310351 A1 * | 10/2014 | Danielson ............. | H04L 65/403 709/204 |

* cited by examiner

*Primary Examiner* — Jeffrey A Gaffin
*Assistant Examiner* — Justin Lee
(74) *Attorney, Agent, or Firm* — Kilpatrick Townsend & Stockton LLP

(57) ABSTRACT

A tree building system that accesses data from a social networking site and, in some embodiments, other data sites having information that may pertain to the relationships between users of the social networking site. A rules engine within the system implements logic for analyzing the data from the social networking site. The system provides a candidate list of possible relatives for selection by a user and solicits information from the user through the use of guided questions.

20 Claims, 6 Drawing Sheets

SYSTEM AND METHOD FOR CREATING A FAMILY TREE DATA STRUCTURE

BACKGROUND OF THE INVENTION

Creating family trees has become popular in recent years. The process of building a family tree can be time consuming, since it often involves manually examining public records and other data sources to identify possible relationships between people. Popular social networking sites, such as FACEBOOK and MYSPACE, will sometimes state family relationships among users of those sites. While such sites collect enormous amounts of data that could be useful in determining family relationships, the data is usually self-reported by users, and thus is not always accurate or reported by users in a consistent or clear manner. A just one example, people on social networking sites may refer to another person as a "brother" or "sister," reflecting that they consider the person to be like a brother or sister, even though the person is not an actual family member. There has thus arisen a need for making effective use of social networking and other sites to build family trees, taking into account that the data on those sites may not be entirely reliable or accurate.

BRIEF SUMMARY OF THE INVENTION

There is provided, in accordance with embodiments of the present invention, a system and method for creating a family tree using data from a social networking site.

In one embodiment, a method is provided for implementing an interactive display of a family tree, illustrating family members and the relationships between family members. The method includes providing, by one or more computing systems, access to a data store of information corresponding to one or more of a plurality of users of a social network environment, wherein the social network environment comprises a plurality of data nodes, each data node representing data relating to a corresponding one of the plurality of users, and a plurality of edges, each edge defining a connection between a corresponding pair of the nodes.

The method further includes determining, by the one or more computing systems, whether the connection between a first node, corresponding to a first user, and any one of a plurality of second nodes, corresponding to other users, reflects a possible family relationship, generating, by the one or more computing systems, a score for each connection reflecting a possible family relationship, the score based on a likelihood of a family relationship, and displaying, in an order according to the score, user names for the other users corresponding to each of at least some of the second nodes. The method further includes receiving, from the first user and based on the displayed user names, a selection of at least one of the second nodes as representing a relative, receiving, from the first user, data identifying the family relationship of the relative, represented by each of the selected second nodes, and arranging the first node and the selected second nodes in a family tree, with the arranged nodes connected according to the family relationship between the arranged nodes.

A more complete understanding of the present invention may be derived by referring to the detailed description of the invention and to the claims, when considered in connection with the Figures.

BRIEF DESCRIPTION OF THE DRAWINGS

FIGS. 4-6 illustrate various screens seen at the user system at various steps in the process of FIG. 3.

DETAILED DESCRIPTION OF THE INVENTION

Figure 1:
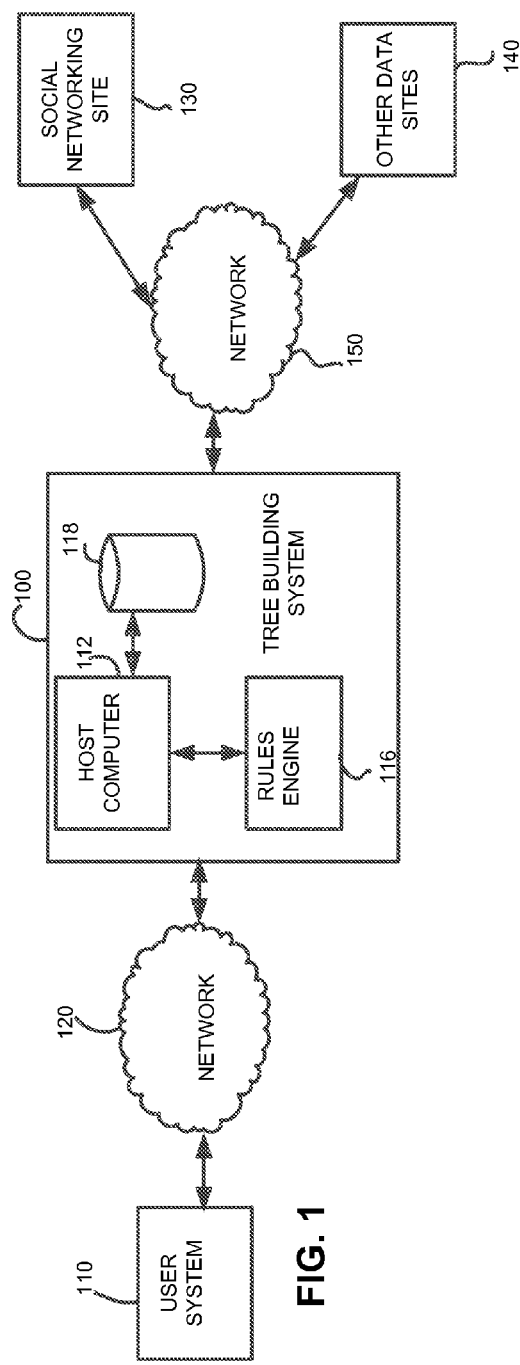
FIG. 1 is a general block diagram showing a tree building system according to one embodiment of the invention, connected through various networks to a user system and to social networking and other data sites.

There are various embodiments and configurations for implementing the present invention. One such implementation is shown in FIG. 1, where according to an embodiment of the invention, a family tree building system 100 is connected to a user system 110 through a network 120 and is connected to a social networking site 130 and to other databases or data sites 140 through a network 150.

The user system 110 may be any type of computer operated by a user, such as a personal computer, laptop, notebook, mobile computing device, and the like, for use in building a family tree. In one embodiment, the user system 102 may include a communications interface, a processor, and a memory device, to enable the user system 110 to interact with the tree building system 100 for implementing various processes, which will be described later in conjunction with FIG. 3. For example, the user system 110 may display a user interface or screen (examples of which will be described later in conjunction with FIGS. 4-6) that enables a user to enter and/or receive information on family members or possible family members in order to build and display a family tree.

The networks 120 and 150 are illustrated as two separate networks but, as should be appreciated, they may both be part of one network "cloud" that includes various interconnected networks over which various systems, servers, hosts and other devices (including those illustrated in FIG. 1) may communicate. The networks 120 and 150 may include packet-based wide area networks (such as the internet), private networks, wireless networks, satellite networks, cellular networks, and other communications networks.

The social networking site 130 is of a type used by members to communicate or "connect" with each other, such as social networks created on FACEBOOK, MYSPACE and the like. Generally, these sites enable a member to build a network of connected "friends," e.g., acquaintances, family members, colleagues, and in some cases, organizations. Thus, in this context, the term "friend" is used broadly to mean any person that a user wants in his or her network.

The site 130 not only permits a member to post news or current information which can be accessed by others in the member's network, but also stores a member profile for each user that, among other things, can be used to identify connections or common interests in order to expand a current network of friends or establish a new networks of friends. A social networking site, such as site 130, can thus have a vast amount of stored data, organized as a social structure or environment made of individuals, groups, entities, or organizations generally referred to as "nodes," which are tied (connected) together by one or more specific types of interdependency. Social network sites are sometimes described and viewed graphically (e.g., as a social graph) when considered in the context of network theory, and in that commonly used context they are depicted and understood as data nodes and edges. Nodes represent the individual users or members within the networks, and edges represent the relationships between the users. The resulting graph-based structures can be very complex. There can be many kinds of edges between nodes. In its simplest form, a social network, or social graph, is a map of all of the relevant edges between all the nodes being studied. A more complete description of social networks and the manner in which they are created and managed by a social network site operator, such as FACEBOOK, can be found in U.S. Pat. No. 8,180,804, issued on May 15, 2012, to Srinivas Narayanan et al., which is hereby incorporated by reference.

For purposes of the present description, it should be appreciated the social networking site 130 has data or information on large numbers of members, including member profile information that may be useful in discovering relationships, such as family relationships, between members. However, as mentioned earlier, the relationship information can often be difficult to understand and may be inaccurate, since it is largely self-reported by members and may reflect only how an individual member views a relationship rather than what the relationship may, in fact, be.

The other data sites 140 represent separate sources of information (i.e., separate from the social networking site 130) that could, in some embodiments, be used to verify or identify relationships in conjunction with the networking site 130. Data sites 140 may include public databases maintaining vital statistics (such as birth, marriage and death records), as well as other public or private databases containing information that might be useful in connecting people (and determining their relationships) using names, addresses, phone numbers, email addresses and so forth, as will be described later.

As seen in FIG. 1, the tree building system 100 includes a host computer 112, a rules engine 116 and a database 118. The host computer 112 manages the flow of data between the user system and the social networking and other data sites 130,140, and processes that data (using rules engine 116) for purposes of building a family tree. Briefly, in response to a request from a user to build a family tree, host computer 112 accesses information from social networking site 130 that is potentially relevant to the family tree (e.g., information on actual or potential family members), and a family tree is built based both on analysis of the data (e.g., in accordance with rules and logic implemented in the rules engine 116) and on input from a user at the user system 110. Data retrieved from the site 130 (and sites 140) may be stored in database 118 for purposes of analysis, and as the family tree is built, data pertaining to people in the family tree and their connections or relationships to each other are also stored in the database 118 and provided for display at the user system 110.

Figure 2:
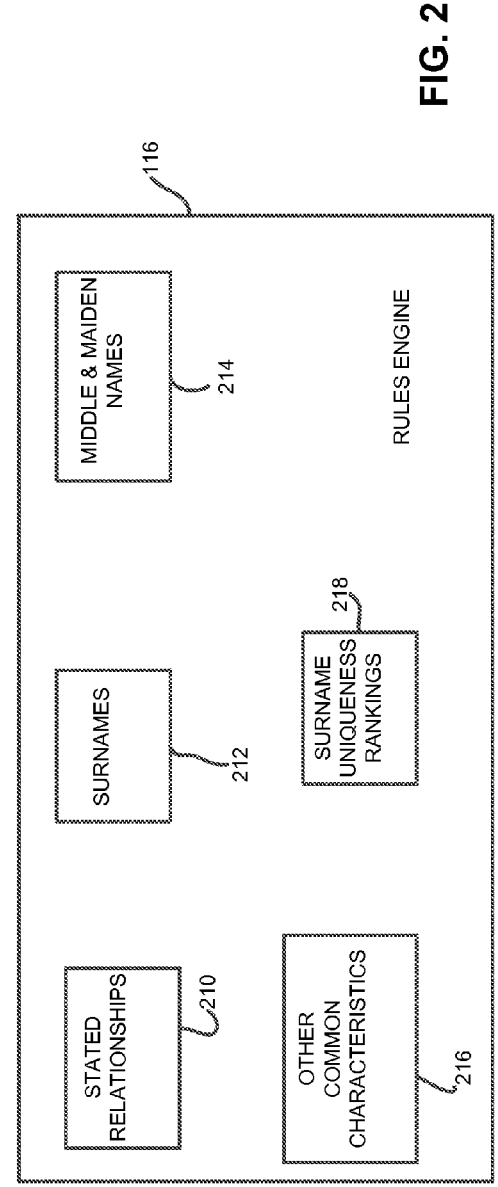
FIG. 2 is a block diagram illustrating the rules engine within the tree building system of FIG. 1.

FIG. 2 illustrates in greater detail the functional grouping of rules within the rules engine 116. The rules engine 116 implements logic for analyzing data (e.g., data relating to users, such as their member profiles stored at the social networking site 130, and related data stored at other sites 140) and, in the embodiment illustrated in FIG. 2, can be categorized into several basic rules groups or categories, namely, "Stated Relationships" rules 210, "Surnames" rules 212, "Middle and Maiden Names" rules 214, "Other Common Characteristics" rules 216, and "Surname Uniqueness Rankings" rules 218.

Stated Relationship Rules 210

This rule category relates to relationships that are included in data maintained at a social networking site, such as site 130. As an example, FACEBOOK will ask a user about his or her relationship to another user when they are linked (i.e., becomes "friends"), and if indicated as a relative, the user is able (but not necessarily required) to post, to that user's profile, information on how they are related (e.g., brother, sister, cousin, etc.). However, as mentioned earlier, sometimes relationships stated by users are not accurate. As will be described later, the system 100 uses the stated relationship rules, among other things, to suggest a list of candidates for inclusion in a family tree, from which the user selects candidates that will be added to the family tree. This selection by the user, in effect, prevents some suspicious stated relationships from being used in the family tree. As will also be discussed in greater detail later, in one embodiment, the system 100 also lists candidates in an order based on a score for each candidate (i.e., a score reflecting the likelihood that the candidate is in fact a relative). Suspicious relationships can be given a lower score (and will appear lower in the list of candidates) than stated relationship that are not suspicious. The degree of "suspicion" that is attributed to a stated relationship can be based on a number of factors. For example, based on empirical evidence, female users that are under 21 years of age are more likely that any other demographic group to refer to another person as a "sister" or "brother," even if they are not actual relatives. Stated relationships from such users can be given less weight and will tend to produce a lower candidate score. Likewise, the system 100 may itself develop rules based on experience with certain users. For example, stated relationships from a specific user may be found over time to be suspicious due to that user's stated relationships rarely being selected by other users when building a family tree (indicating that other users often disagree with stated relationships provided by that user), and thus any stated relationships from that user will be given less weight in scoring candidates for selection and inclusion in a family tree.

It should be appreciated that a suspicious stated relationship is not necessarily a reflection on the honesty of a user stating the relationship, but more often reflects the culture or vernacular of some demographic groups, where certain words (such as "brother," "sister," and "cousin") do not necessarily indicate an actual family tie. The rules 210 are thus designed to accommodate various cultures or vernaculars.

It should also be pointed out that stated relationships may not necessarily be those provided by a user in building his or her profile when creating networks of friends. In one embodiment, the system 100 may be programmed (via the stated relationship rules) to look for relationships that might be mentioned in the text of postings or messages between users at a social networking site. For example, if one user refers to another user as a relative (or uses words or phrases such as "my brother," "my sister," "my cousin") when referring to another user, the use of such words or phrases can be captured by the system 100 and recognized as indicating a possible relationship, and then later evaluated for accuracy or reliability (e.g., by comparison to other relationship data, if any, pertaining to the person).

Surnames Rules 212

This rules category uses logic to identify candidates for family tree based on similarities of surnames (last names). In one embodiment, users with identical surnames are generally chosen by the rules 212 as candidates (at least initially) if they are within the user's network of "friends," or within a second level of connection (a person not in the user's network, but rather a friend's network, i.e., a "friend" of a "friend"). Even more remote connections might be used, but they typically would be given less weight, depending on how far removed the original connection. In some cases, where a user has a compound surname (two names joined, e.g., with a hyphen), the rules 212 will parse the compound names and evaluate each name individually as a surname in identifying candidates. Uniqueness of surnames will be described later as a method for weighting surnames when scoring candidates, but other common personal information may be used as well (such as candidates having same addresses, phone numbers, and email addresses, as other users). Personal data for candidates for a family tree might be retrieved for evaluation from the social networking site 130 and, in other embodiments, from other data sites 140.

Middle and Maiden Names Rules 214

Some social networking sites may ask for middle or maiden names from a user, and in such case they can be compared (by rules 214) to the surname of the user for whom family tree candidates are being compiled. More commonly, social networking sites ask for only first and last names as part of creating a user profile, and in such case the system 100 uses the rules 214 to examine the first name fields of users for entry of multiple names (indicating that a person has included, with a first name, also a middle name in a second position within the first name field). It should be understood that the middle name may in fact be a given name (e.g., given at birth), but may also represent a maiden name. As will be described, a maiden name may be useful in identifying candidates.

In one embodiment, the user's surname (or the user's middle or maiden name, if any) can be compared to names in the second position of the first name field for people in the user's network of friends, or in some cases, a broader population of people who are members of the social networking site 130.

Other logic for analysis of middle or maiden names can be implemented by the rules 214. For example, if two names appear in a first name field, the second name can be compared to names of potential or known siblings. If there is a match, then the second name is likely to be a maiden name and further searches can be conducted using the maiden name to find possible relatives of the user. In that situation, relatives of a user's husband (those relatives having the same name as the husband, other than offspring) might be removed from the candidate list (based on the assumption that the user is only interested in her family and is not building a family tree to include her husband's relatives).

Other Common/Relevant Characteristics Rules 216

Other common characteristics of people (whether in the user's network of friends or not) can be identified and used to determine if a person should be included in the candidate list. As examples, social networks may ask for profile information on a user's home town. People with the same surname having the same home town or hometowns near each other might be related, taking into account (and appropriately weighting) the size of the hometown (e.g., two people from the same, small home town with the same last name are much more likely to be related than two people with the same last name from a large city). Other relevant characteristics can also be used and weighted in selecting candidates, not only positively but negatively (indicating either a higher likelihood or a lower likelihood of being a relative). For example, age and gender can be considered. A stated relationship of "father" may be given little or no weight if the person stated as a "father" is a woman, or if the person is very close in age to a user.

Surname Uniqueness Rankings Rules 218

As should be appreciated, two people having the same, unique last name are much more likely to be related to each other than two people having a very common last name. The rules 218 maintain a uniqueness ranking for every or nearly every surname, and would weight the uniqueness of the surname when determining how to score a person in the list of candidates for a family tree (or when determining whether such a person should even be included in the candidate list).

The rankings could involve hundreds of thousands (if not millions of surnames), taken from public records or other resources with listings of last names of people. In one simple implementation, a ranking process for each surname could simply count the number of people (in a large public data source, such as a national directory) that each have the same surname in order to determine a uniqueness ranking for that surname.

As should be appreciated from the preceding discussion, the various rule engines work together and weight the various factors (stated relationships, surnames, middle and maiden names, other common/relevant characteristics) using a scoring model and arriving at a score for each person provided in a candidate list of people for a user's family tree. The actual weighting factors may change based on fine-tuning and honing of the scoring model, and might change over time based on experience with a large number of users and their selections from candidate lists. Based on that empirical and experiential data, predictive data can be generated as to how certain factors are likely to indicate the likelihood of a person being selected as a relative. The predictive characteristics may be identified and then built into the model. In alternative embodiments of the present invention, neural models or other known models may be used to score candidates instead of statistical models.

Figure 3:
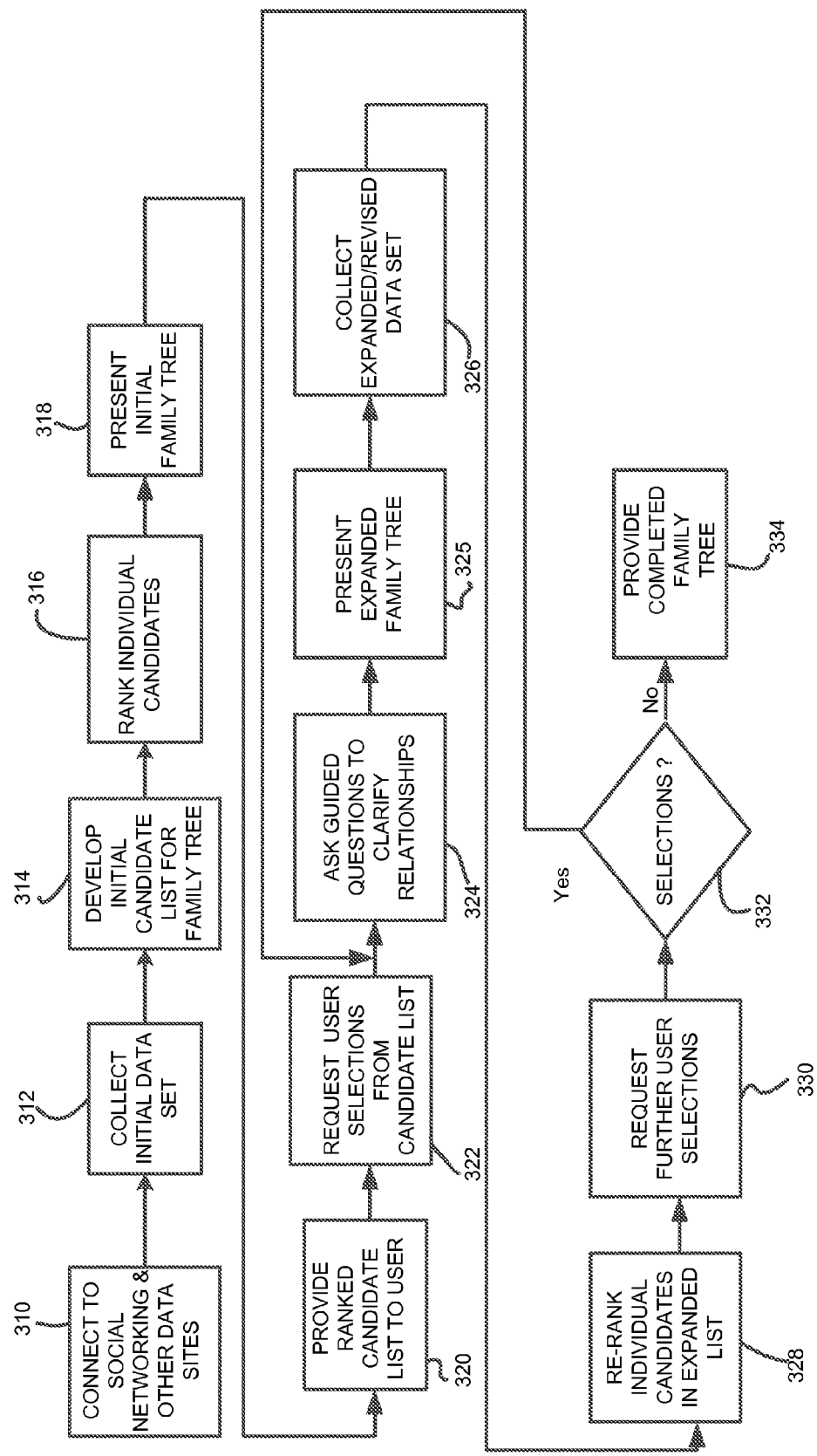
FIG. 3 is a flow diagram illustrating a process for building a family tree using data from social networking and other data sites.

FIG. 3 illustrates an exemplary process for building a family tree, carried out at the system 100 and based on data from social networking site 130 and, in some embodiments, data from social networking site 130 in conjunction with data from other data sites 140.

At step 310, the system 100 connects to the social networking site 130 (and, if appropriate, to other data sites 140). As an example, the user may be at a site hosted at system 100 and be asked by a screen prompt if the user wants to build a family tree using the social networking site 130. If so, the user is then prompted to enter his or her login information for the site 130. The system 100 then logs into site 130 on behalf of the user and accesses data at the site 130 that is associated (directly or indirectly) with the user. The data is retrieved or collected from the site 130 (and at the sites 140 in some embodiments) at step 312. As will be more fully explained below, an initial data set will be retrieved for building the family tree, but additional data may be collected later based on input from the user (such as selections from the candidate list of possible relatives).

At step 314, an initial candidate list for the family tree is developed, using the rules engine 116 and based on an analysis of the user's profile information and data relating to the user's network of friends, as was collected from the site 130 at step 312. Each individual candidate in the initial list is ranked at step 316, according to the likelihood of the candidate being a relative of the user (using the various rules in rules engine 116 as described earlier). The ranking of candidates at step 316 may, in one embodiment, involve a ranking score being given to each candidate which determines its order in the list and may be stored in database 118 as part of the data defining the connection or edge between two users and their nodes. As will be discussed later, that ranking score may be adjusted as the user selects people from the list.

Figure 4:

An initial family tree and an initial candidate list are presented to the user at steps 318 and 320. One example of an initial candidate list is illustrated in FIG. 4 where, for an exemplary user ("Stephen Jones"), an initial candidate list 410 is displayed. Each person in the candidate list 410 has been determined to be a possible relative of the user. Displayed for each candidate is appropriate information, including, as illustrated in FIG. 4, the name of the candidate, a picture (if any) of the candidate maintained at the site 130, and a brief description of the basis for determining that candidate to be a possible relative (e.g., the candidate's identified relationship to someone that is a known or stated relative of the user). Also seen in the display 410 is an "add" 430 button next to each candidate, which can be selected by the user to add that candidate to the family tree.

FIG. 4 illustrates an initial family tree 420 that could be presented to the user at step 318. In this embodiment, the illustrated initial tree is simply three nodes—the user and his two parents. The parents ("Eugene Jones" and "Marjorie Smith") may be known to the system 100 from information provided by the user. For example, the system may ask for the names of parents before presenting the initial candidate list 410. As should be appreciated, it is useful for the user to provide at least parents in the initial family tree 420, since building of the tree will often initially involve brothers, sisters, children, and cousins of the user, and having the parents in the tree initially will permit such relatives to be more conveniently illustrated with proper connections showing their respective relationships to the user. However, it should be likewise be appreciated that in some embodiments only the user himself might be seen in the initial family tree, with relatives added (with or without connections to parents) as they are selected by the user. In yet other embodiments, the user might have more than three nodes initially presented. For example, the user might be asked for names of parents, siblings or other relatives before presenting the initial candidate list 410 and the initial family tree 420. In some embodiments, the display may contain phantom nodes and connections until more information is provided (e.g. parent nodes might be automatically displayed to illustrate connections between a user and the user's siblings, but not identify the parents until names are provided by the user).

Returning to FIG. 3, at step 322 the user is requested to select a person in the candidate list (using button 430). It is possible (although unlikely) that the initial candidate list may not have a person that can be selected by the user an actual relative, in which case the system 100 may simply tell the user that building a family tree may not be possible without further information. However, with a typical social networking site (such as FACEBOOK), having millions of users, it is unlikely that the user will not be able to identify at least one person in the candidate list 410 as a relative. For example, the system 100 could be designed to cast a wide enough search of all available data at the site 130 and initially provide a large list of candidates, such that in most cases the user will be able to identify at least one person as a relative. Further, the system 100 may also access the other data sites 140 having public records to cast an even wider search for possible relatives, if desired. In one embodiment, the user may be asked to provide the names of some relatives initially, to help the system 100 develop the initial list of candidates.

Figure 5:
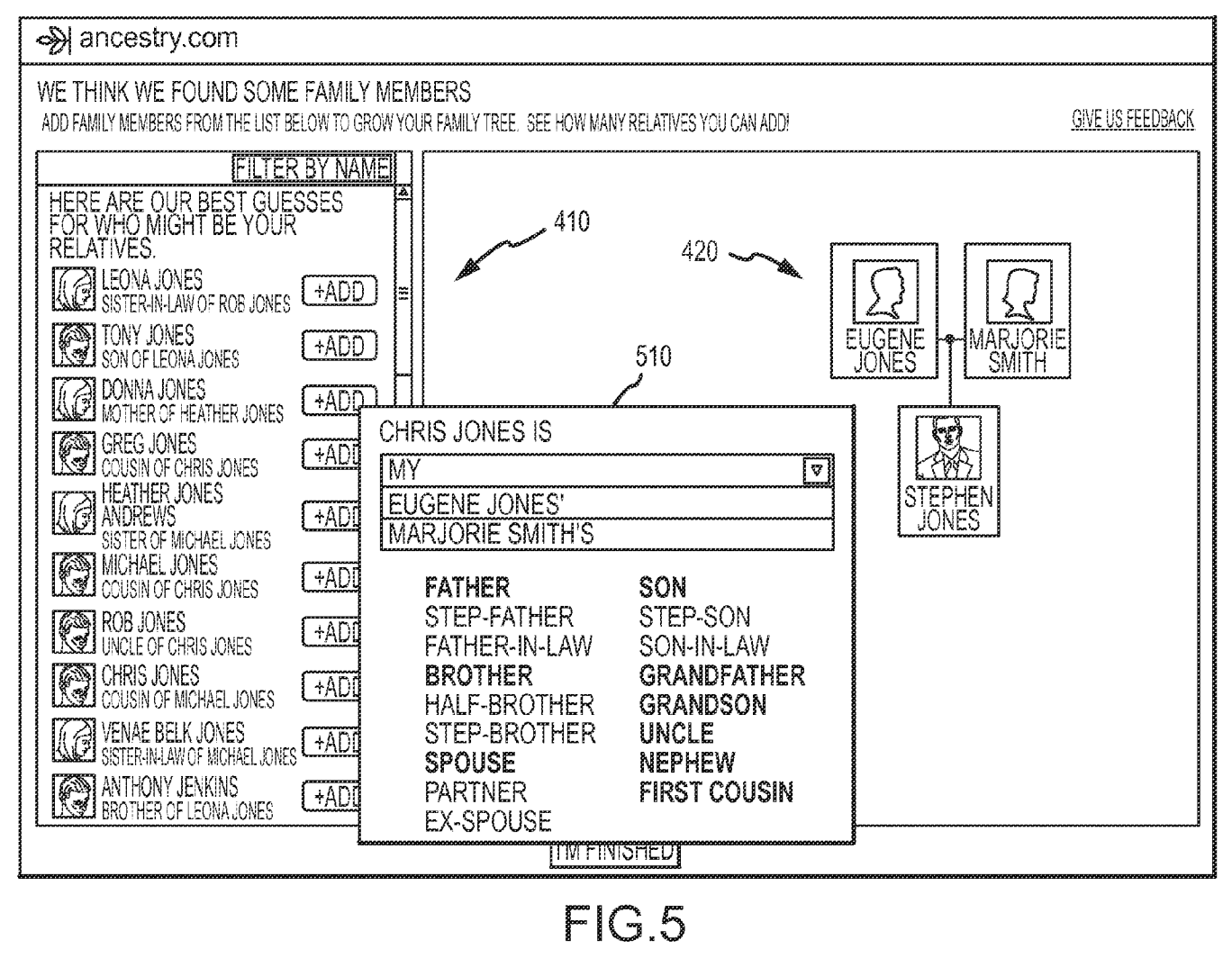

FIG. 5 illustrates a screen seen by the user after making an initial selection from the list 410. In this example, the user had selected "Chris Jones" as a relative. Of course, merely selecting a relative will not normally, in and of itself, provide enough information to determine the relationship between the user and the selected candidate, for purposes of placing the selected relative in the family tree. At step 324 (FIG. 3) the user is asked guided questions to determine the relationship. The questions may be presented in the form of selection box 510 illustrated in FIG. 5. Since the system knows, at this point, only three people in the family tree 420, the question box asks for the relationship of the selected candidate to the three nodes or people in the tree (the user and his two parents). In this particular example, the selected candidate is a son of the user (as indicated by a selection made at box 510), and before adding that candidate (a son of the user) to the family tree, the system will ask (through an additional selection box not seen in the drawings) for the mother of selected candidate, and then add the selected candidate (Chris Jones) and the mother of selected candidate (Cheryl Moore) to the expanded family tree 620 seen in FIG. 6, and then present the expanded family tree to the user (step 325).

It is noteworthy that candidates in most cases are not added to a family tree without questions being asked at step 324. For example, without more information, the system 100 may not know where to put the candidate (and know how to show the relationship or connection to the user) in the family tree. However, in some cases, it is a possible that a direct relationship to the user might be known, e.g., where another user has stated at the site 130 that he/she is the father, mother, brother, sister, son, or daughter of the user, such a relationship is shown in the description of the candidate (at candidate lists 410,610), and when the user selects the button 430 corresponding to that candidate, no further questions about the relationship may be needed.

In other cases, even if a relationship is generally known, or if the relationship is provided by the user at box 510 (FIG. 5), further information may be needed before the candidate can be shown in the family tree. As an example, suppose that at box 510 the user has indicated that a selected candidate is a nephew of the user. This information is, in itself, not complete enough for the system to know where to show the selected candidate. Relationships due to marriage will often lead to ambiguity when trying to define a relationship. For example, the selected candidate (nephew) could be the son of a sibling of the user, or alternatively, could be the son of a sibling of the user's spouse. While not seen in Figures, in the foregoing example the system 100 may be configured to display a second selection box immediately after box 510, asking the user to clarify whether (1) the selected candidate (nephew) is a son of a user's brother or sister (and, if not already known, also ask the name of that brother or sister) or (2) the selected candidate (nephew) is a son of a spouse's brother or sister (and, if not already known, also ask the name of the spouse and the name of the spouse's brother or sister). Once all the necessary information had been collected from the guided questions (depending on the nature of the stated relationships), the expanded family tree is presented (step 325).

As noted earlier, the rules engine 116 could be designed to accommodate different cultures. Thus, the nature of the guided questions could be based on the known country of the user (or a country preference provided by the user). As an example, if the user (and his or her relatives) are in Sweden, the generic designation "uncle" is not normally used, but rather an uncle is designated as either a "father's brother" or a "mother's brother." In that instance, a user would not need to be asked for clarification as to an uncle.

Also, the rules engine 116 could be designed to prevent an improper relationship from being provided in answers to guided questions. For example, if a person is known to be the parent of a cousin of the user, the system will not permit the user to designate the same person as a sibling of the user.

Figure 6:
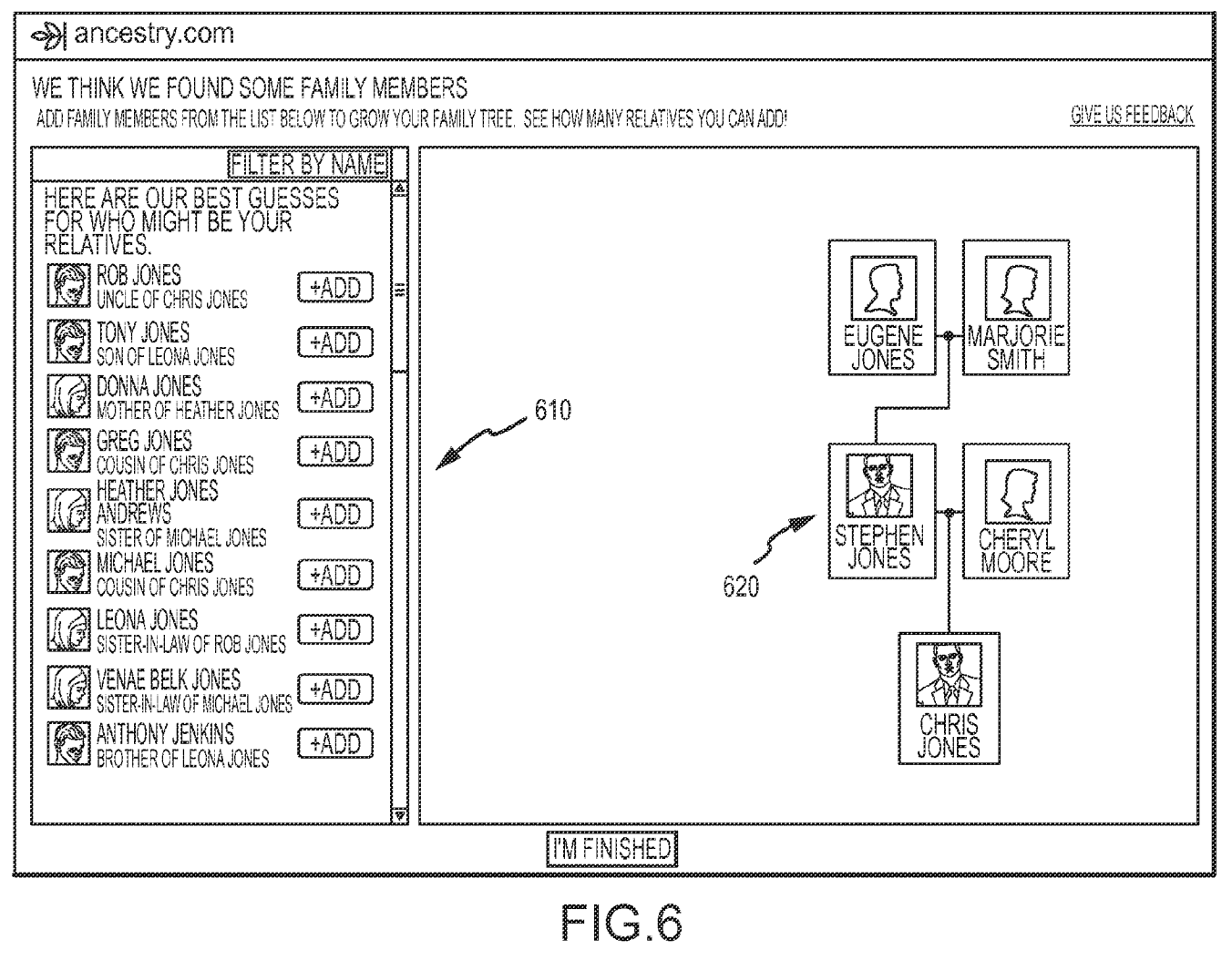

Once a candidate has been selected and the specific relationship has been determined (such as through the use of guided questions), and the family tree has been expanded to include a selected candidate, the system 100 then returns to the site 130 (and if appropriate, to the other data sites 140) to collect additional data for an expanded or revise data set, step 326. For example, based on the selection of a candidate and a now known relationship to the user, other members or users of the social networking site 130 may now be added to the candidate list (based on relationships to previously selected candidates). Also, candidates in the list may be more likely or less likely to be relatives based on the selections from the candidate list. As such, the individuals in the candidate list are re-ranked based on the expanded or revised data set, step 328. The revised candidate list 610 is illustrated in FIG. 6, where it can be seen that the order of the illustrated candidates has changed relative to previous candidate list 410. For example, "Rob Jones" now appears at the top of the list, with that position in the list based on Chris Jones having been established as a son of the user. "Rob Jones," who is described as an "uncle of Chris Jones" and has the same last name as the user ("Stephen Jones"), is now determined by rules engine 116 to be a likely sibling of the user and has a much higher ranking in the candidate list.

Once the revised candidate list is presented, the user is again asked to make selections for those individuals recognized as relatives (step 330), and if there is a selection (step 332), the process repeats steps 324-330. This sequence of steps is repeated (as many times as needed) until no further selections are made at the candidate list at step 332, at which time the completed family tree is provided to the user, step 334.

It should be noted that the access to the other data sites 140 might occur during various steps in the process seen in FIG. 3. In some embodiments, the data sites 140 might be accessed initially at step 312 in conjunction with the data being accessed at the networking site 130, and the data together (from both site 130 and sites 140) is used at step 312 to present an initial candidate list to the user at step 314.

As an example, the rules engine 116 may use an email address associated with a user and provided at step 312 from the social networking site 130 to query a database (at data sites 140) that associates email addresses with people. Based on that query, it can be determined whether or not another person is using that same email address as the user. If there is such another person using the same email address, then that person can be added to the list of candidates, or if already on the list of candidates, the ranking of that person in the list can be increased. Other factors, of course, might be used in conjunction with a common email address to determine whether the person is likely to be a relative, such as that other person having the same surname or having the same home address as the user. All such common characteristics in common can be weighted by the rules engine 116 to determine the ranking of the other persons (as described earlier). Common identifying addresses could also be used to eliminate duplicate candidates. For example, if two people with similar names (e.g., "Bob Jones" and "Robert Jones") have the same email address (or home address), the system could determine that they are likely the same person and need not both appear on the candidate list. The user could be asked by the system to confirm that two possible candidates having similar names (and having the same physical address and/or the same email address) are in fact the same person and the data for each can be associated with a single person in the candidate list.

As another example, the databases at data site 140 can be used to acquire additional information concerning the user for whom the family tree is being developed. Any information on the user accessed from the networking site 130 or, in some embodiments, as requested from the user by the system 100 (such as name, email address, hometown, phone number) can be provided to the data sites 140 and used to find a match (the same person). All the data pertaining to that person available at the data sites 140 is cross checked against other people (for whom data is maintained at the data sites 140) to find possible relatives. Those possible relatives may be added to the candidate list or, if already on the candidate list, may be re-ranked in the candidate list based on the reliability of the data from the sites 140. It should be appreciated that the data at the data sites 140 can come from numerous and different sources of public and private information, including vital statistics (e.g., information on births, marriages, and deaths), personal information collected on individuals such as addresses/residences (or histories of addresses), phone numbers from directories, financial account information from banks (e.g., information on joint account holders), news articles having stated relationships, and so forth. As an example, one of the data sites 140 could be databases available from Lexis/Nexis (Dayton, Ohio), a division of Reed Elsevier Group plc., and similar companies, which collect and organize data from a wide variety of public and private sources and make such data available to subscribers. The reliability of the data from each source could itself be scored (e.g., based on past experiences with use of the data and its determined accuracy), and the scored accuracy can be used in arriving at a ranking of a candidate in a candidate list, to the extent such data source is used in placing a candidate on the candidate list.

As yet another example, data sites 140 might include data maintained for users at popular email sites, such as yahoo.com, gmail.com and others. Such sites often have email address folders created by individual users that pertain to relatives of the user. Thus, a user might store all his or her relatives' email addresses in a single address folder under a folder name that includes the words "family" or "relatives," or similar words. If the user has consented (and provided an appropriate login data) to the system 100, the system can access the user's email account, search for folders likely pertaining to relatives, and retrieve those email addresses (as well as names and other identifying data that might be associated with those addresses), for analysis at the rules engine 116.

In a further example, the system 100 might access every person in the user's email address book at the user's email account, and apply rules (such as those described earlier in connection with rules engine 116), to identify possible relatives and add them to the candidates list, if appropriate. The system could likewise access an address book in the user's mobile device (for names, phone numbers, email addresses) and apply rules to identify possible relatives.

In yet another embodiment, the system 100 might access the user's email account and automatically send an email on behalf of the user to each person selected as a relative from the candidate list (and having an email address in the user's email address book), asking that relative to contribute information to the family tree.

While some of the above examples illustrate the use of other data site 140 when data is initially collected at step 312 for developing an initial candidate list at step 314, it should be appreciated that those data sites 140 could also be accessed at other points in the process of FIG. 3, such as at step 326 (each time after a user has made selections from the candidate list).

It should also be appreciated that in some instances, a user may have already developed a family tree or portion thereof, and the system 100 could use the features described herein to augment the family tree. For example, the user may have already developed a family tree at a well known genealogy website (such as Ancestry.com), and the system 100 might be accessed through such website to apply the features described herein to the existing family tree (e.g., the existing family tree might be presented at step 318) in order to add further family members.

Figure 7:
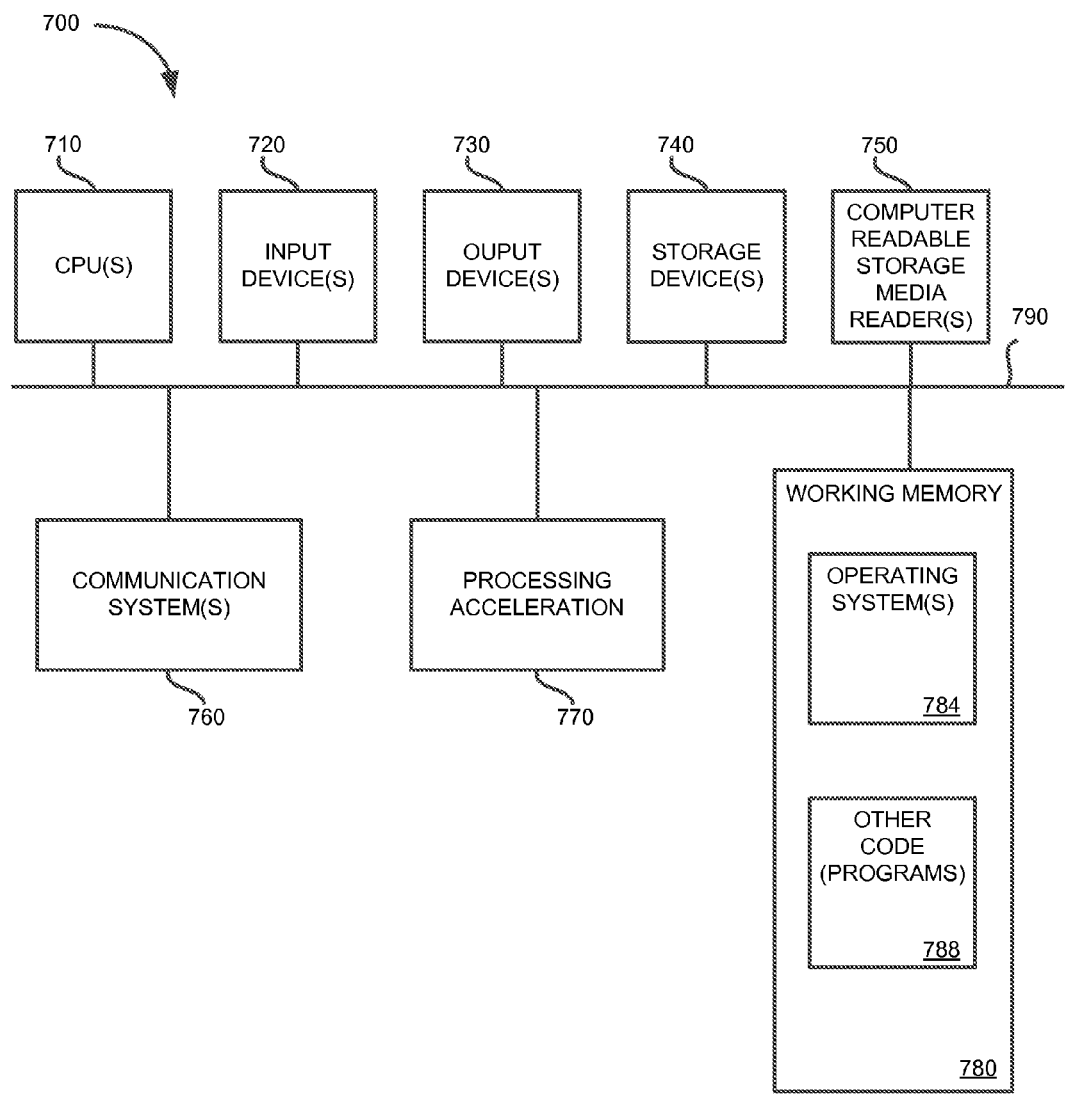
FIG. 7 is a block diagram illustrating an exemplary computer system upon which embodiments of the present invention may be implemented.

FIG. 7 is a block diagram illustrating an exemplary computer system upon which embodiments of the present invention may be implemented. This example illustrates a computer system 700 such as may be used, in whole, in part, or with various modifications, to provide the functions of the tree building system 100, including the host computer 112 and the rules engine 116, the user system 110, the social networking site 130, and the other data sites 140, as well as other components and functions of the invention described herein.

The computer system 700 is shown comprising hardware elements that may be electrically coupled via a bus 790. The hardware elements may include one or more central processing units 710, one or more input devices 720 (e.g., a mouse, a keyboard, etc.), and one or more output devices 730 (e.g., a display device, a printer, etc.). The computer system 700 may also include one or more storage devices 740, representing remote, local, fixed, and/or removable storage devices and storage media for temporarily and/or more permanently containing computer-readable information, and one or more storage media reader(s) 750 for accessing the storage device(s) 740. By way of example, storage device(s) 740 may be disk drives, optical storage devices, solid-state storage device such as a random access memory ("RAM") and/or a read-only memory ("ROM"), which can be programmable, flash-updateable or the like.

The computer system 700 may additionally include a communications system 760 (e.g., a modem, a network card—wireless or wired, an infra-red communication device, a Bluetooth™ device, a near field communications (NFC) device, a cellular communication device, etc.) The communications system 760 may permit data to be exchanged with a network, system, computer, mobile device and/or other component as described earlier. The system 700 also includes working memory 780, which may include RAM and ROM devices as described above. In some embodiments, the computer system 700 may also include a processing acceleration unit 770, which can include a digital signal processor, a special-purpose processor and/or the like.

The computer system 700 may also comprise software elements, shown as being located within a working memory 780, including an operating system 784 and/or other code 788. Software code 788 may be used for implementing functions of various elements of the architecture as described herein. For example, software stored on and/or executed by a computer system, such as system 700, can be used in implementing the processes seen in FIG. 3.

It should be appreciated that alternative embodiments of a computer system 700 may have numerous variations from that described above. For example, customized hardware might also be used and/or particular elements might be implemented in hardware, software (including portable software, such as applets), or both. Furthermore, there may be connection to other computing devices such as network input/output and data acquisition devices (not shown).

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention. As one example, the tree building system 100 may be implemented by a single system having one or more storage device and processing elements. As another example, the tree building system 100 may be implemented by plural systems, with their respective functions distributed across different systems either in one location or across a plurality of linked locations.

Moreover, while the various flows and processes described herein (e.g., those illustrated in FIG. 3) are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method for implementing, at a family tree building system, an interactive display of a family tree with family members and relationships between family members, the method comprising:

providing, by one or more computing systems, access by the family tree building system to a data store of information at a social network website corresponding to one or more of a plurality of users of the social network website, the social network website operated at a system separate from the family tree building system that implements the display of a family tree, wherein access to the data store at the social network website is through a user of both the family tree building system and the social network website, wherein that user provides login information to the family tree building system in order for the family tree building system to access the separate social network website, and wherein the social network website comprises:

a plurality of data nodes, each data node representing data relating to a corresponding one of the plurality of users, and a plurality of edges, each edge defining a connection between a corresponding pair of the nodes;

determining, by the one or more computing systems, whether the connection between a first node in the social network website, corresponding to a first user, and any one of a plurality of second nodes in the social network website, corresponding to other users, reflects a possible family relationship for inclusion in the family tree;

generating, by the one or more computing systems, a score for each connection reflecting a possible family relationship between the first node and the one of the plurality of second nodes in the social network website for inclusion in the family tree, the score based on a likelihood of a family relationship between the first node and the one of the plurality of second nodes in the social network website;

displaying, in an order according to the score, user names for the other users corresponding to each of at least some of the second nodes;

receiving, from the first user and based on the displayed user names, a selection of at least one of the second nodes as representing a relative;

receiving, from the first user, data identifying the family relationship of the relative, represented by each of the selected second nodes; and arranging the first node and the selected second nodes, accessed from the separate social networking website, as arranged nodes in the family tree, with the arranged nodes connected in the family tree according to the family relationship between the arranged nodes.

2. The method of claim 1, wherein the step of determining whether the connection represents a possible family relationship and the step of generating a score are each performed based on analyzing and providing a weight to one of more of the following factors:

relationships identified in each connection;

a match of surnames between users corresponding to the first node and any one of the second nodes;

a match of a surname to middle name between users corresponding to the first node and any one of the second nodes;

the gender of users corresponding to the first node and any one of the second nodes;

the uniqueness of surnames of users corresponding to the first node and any one of the second nodes; and the relative ages of users corresponding to the first node and any one of the second nodes.

3. The method of claim 1, wherein at least some of the data represented at each data node is provided by the corresponding one of the plurality of users.

4. The method of claim 1, wherein the data represented at each data node includes an identifier for the corresponding one of the plurality of users, and wherein the method further comprises:

accessing a database, separate from the social network website and having information on one or more of the plurality of users;

using the identifier to retrieve, from the database, information for the corresponding user; and determining if the retrieved information indicates a possible relationship between users corresponding to the first node and any one of the second nodes.

5. The method of claim 4, wherein the identifier is an email address.

6. The method of claim 4, wherein the identifier is a phone number.

7. The method of claim 1, wherein the step of receiving data identifying the family relationship of the relative comprises providing a list of family relationships, and receiving a selection from the first user of one of the listed family relationships.

8. The method of claim 7, wherein the list of family relationships is selected from a group comprising:

father, mother, son, daughter, wife, husband, uncle, aunt, brother, sister, and cousin.

9. The method of claim 1, further comprising, after receiving from the first user a selection of at least one of the second nodes as representing a relative:

updating an edge defining a connection between the first node and each of the selected second nodes, to reflect the family relationship; and repeating the step of determining whether the connection between the first node and any one of the plurality of second nodes reflects a possible family relationship.

10. The method of claim 1, wherein the data represented at the first node includes an email address for the first user, the email address associated with an email account of the first user, wherein the method further comprises:

using the email address of the first user to access a database associated with an email system that is separate from the social network website, the database having data, including an email address, for one or more of a plurality of people;

retrieving, from the database, data associated with the one or more of the plurality of people; and determining, from the first node and the retrieved data, whether a connection between the first node, corresponding to the first user, and any of the retrieved data indicates a possible family relationship between the first user and the one or more of the plurality of people.

11. A family tree building system for implementing an interactive display of a family tree with family members and relationships between family members, the system comprising:

a processor;

a memory communicatively connected with and readable by the processor and containing instructions that, when executed by the processor, cause the system to:

provide access to a data store of information at a social network website corresponding to one or more of a plurality of users of a social network website, the social network website operated at a system separate from the family tree building system that implements the display of a family tree, wherein access to the data store at the social network website is through a user of both the family tree building system and the social network website wherein that user provides login information to the family tree building system in order for the family tree building system to access the separate social network website, and wherein the social network website comprises:

a plurality of data nodes, each data node representing data relating to a corresponding one of the plurality of users, and a plurality of edges, each edge defining a connection between a corresponding pair of the nodes;

determine whether the connection between a first node in the social network website, corresponding to a first user, and any one of a plurality of second nodes in the social network website, corresponding to other users, reflects a possible family relationship for inclusion in the family tree;

generate a score for each connection reflecting a possible family relationship between the first node and the one of the plurality of second nodes in the social network website, the score based on a likelihood of a family relationship between the first node and the one of the plurality of second nodes in the social network website;

display, in an order according to the score, user names for the other users corresponding to each of at least some of the second nodes;

receive, from the first user and based on the displayed user names, a selection of at least one of the second nodes as representing a relative;

receive, from the first user, data identifying the family relationship of the relative, represented by each of the selected second nodes; and arrange the first node and the selected second nodes accessed from the separate social networking website, as arranged nodes in a family tree, with the arranged nodes connected in the family tree according to the family relationship between the arranged nodes.

12. The system of claim 11, where the system determines whether the connection represents a possible family relationship and generates a score, based on analyzing and providing a weight to one of more of the following factors:
- relationships identified in each connection;
- a match of surnames between users corresponding to the first node and any one of the second nodes;
- a match of a surname to middle name between users corresponding to the first node and any one of the second nodes;
- the gender of users corresponding to the first node and any one of the second nodes;
- the uniqueness of surnames of users corresponding to the first node and any one of the second nodes; and
- the relative ages of users corresponding to the first node and any one of the second nodes.

13. The system of claim 11, wherein at least some of the data represented at each data node is provided by the corresponding user.

14. The system of claim 11, wherein the data represented at each data node includes an identifier for the corresponding user, and wherein the memory further contains instructions that, when executed by the processor, cause the system to:
- access a database, separate from the social network website and having information on one or more of the plurality of users;
- use the identifier to retrieve, from the database, information for the corresponding user; and
- determine if the retrieved information indicates a possible relationship between users corresponding to the first node and any one of the second nodes.

15. The system of claim 14, wherein the identifier is an email address.

16. The system of claim 14, wherein the identifier is a phone number.

17. The system of claim 11, wherein the system receives data identifying the family relationship of the relative by providing a list of family relationships, and receiving a selection from the first user of one of the listed family relationships.

18. The system of claim 17, wherein the list of family relationships is selected from a group comprising:
- father, mother, son, daughter, wife, husband, uncle, aunt, brother, sister, and cousin.

19. The system of claim 11, wherein the memory further contains instructions that, when executed by the processor, cause the system to, after receiving from the first user a selection of at least one of the second nodes as representing a relative:
- update an edge defining a connection between the first node and each of the selected second nodes, to reflect the family relationship; and
- again determine whether the connection between the first node and any one of the plurality of second nodes reflects a possible family relationship.

20. The system of claim 11, wherein the data represented at the first node includes an email address for the first user, the email address associated with an email account of the first user, wherein the memory further contains instructions that, when executed by the processor, cause the system to:
- use the email address of the first user to access a database associated with an email system that is separate from the social network website, the database having data, including an email address, for one or more of a plurality of people;
- retrieve, from the database, data associated with the one or more of the plurality of people; and
- determine, from the first node and the retrieved data, whether a connection between the first node, corresponding to the first user, and any of the retrieved data indicates a possible family relationship between the first user and the one or more of the plurality of people.

* * * * *